United States Patent [19]
Bybee

[11] Patent Number: 5,232,216
[45] Date of Patent: Aug. 3, 1993

[54] SHEET FEEDING APPARATUS FOR FLAT BED OPTICAL SCANNER

[75] Inventor: Jerry L. Bybee, Loveland, Colo.

[73] Assignee: Hewlett-Packard Company, Palo Alto, Calif.

[21] Appl. No.: 902,638

[22] Filed: Jun. 23, 1992

[51] Int. Cl.$^5$ .............................................. B65H 7/02
[52] U.S. Cl. ..................................... 271/228; 271/233
[58] Field of Search ........................ 271/227, 228, 233

[56] References Cited

U.S. PATENT DOCUMENTS

| | | | |
|---|---|---|---|
| 3,510,125 | 5/1970 | Krueger et al. | 271/233 |
| 4,146,219 | 3/1979 | Phillips | 271/233 |
| 4,285,512 | 8/1981 | Shlatz | 271/233 |
| 4,739,983 | 4/1988 | Ide et al. | 271/233 |
| 4,864,366 | 9/1989 | Saeki | 271/233 |
| 5,001,520 | 3/1991 | Kawano et al. | 271/233 |
| 5,026,044 | 6/1991 | Ryon et al. | 271/233 |
| 5,154,412 | 10/1992 | Iseda | 271/233 |

FOREIGN PATENT DOCUMENTS

| | | | |
|---|---|---|---|
| 172153 | 7/1989 | Japan | 271/233 |
| 2040887 | 9/1980 | United Kingdom | 271/233 |

OTHER PUBLICATIONS

Silverberg, M. "Trail Edge Document Registration", Xerox Discl. Journal, vol. 7, No. 1, p. 35 (Jan./Feb. 1982).

Primary Examiner—Robert P. Olszewski
Assistant Examiner—Steven M. Reiss

[57] ABSTRACT

A sheet feeding apparatus for sequentially moving sheets into a predetermined registration position with a sheet support surface of an associated optical imaging device including a sheet displacement assembly for engaging and guidingly displacing the sheet along a predetermined displacement path having an upstream end and a downstream end; an abutment surface disposed along the displacement path in spaced relationship from the sheet support surface; and a drive for driving the displacement assembly for moving the sheet downstream a predetermined distance along the path past the abutment surface, then moving the sheet upstream into edge aligning engagement with the abutment surface and then moving the sheet downstream a predetermined distance along the path.

14 Claims, 7 Drawing Sheets

A. IN RESPONSE TO "LOAD FLAG ENGAGED" SIGNAL AND "POST DOWN" SIGNAL AND "CHANGE DOCUMENT" SIGNAL OPERATE DRIVE MOTOR IN A FIRST DIRECTION TO PRODUCE GEAR CHANGE TO DRIVE FOUR UPPER DRIVE ROLLS IN DOWNSTREAM DIRECTION AND TO DRIVE LOWER BELT IN DOWNSTREAM DIRECTION

↓

B. IN RESPONSE TO SIGNAL FROM FIRST PATH FLAG INDICATING DETECTION OF SHEET LEADING EDGE, REVERSE DRIVE MOTOR SO AS TO OPERATE MOTOR IN A SECOND ROTATION DIRECTION TO PRODUCE GEAR CHANGE TO CONTINUE DRIVING FOURTH UPPER ROLL IN DOWNSTREAM DIRECTION AND TO DISENGAGE FIRST THREE UPPER DRIVE ROLLS AND TO CONTINUE DRIVING OF LOWER BELT IN DOWNSTREAM DIRECTION

↓

C. IN RESPONSE TO SIGNAL FROM FIRST PATH FLAG INDICATING DETECTION OF SHEET TRAILING EDGE, CONTINUE OPERATION OF DRIVE MOTOR IN THE SECOND DIRECTION FOR A PREDETERMINED AMOUNT OF ANGULAR DISPLACEMENT SUCH THAT SHEET IS ADVANCED DOWNSTREAM A PREDETERMINED DISTANCE, THEN REVERSE DRIVE MOTOR TO OPERATE MOTOR IN THE FIRST DIRECTION TO PRODUCE GEAR CHANGE TO DRIVE FOURTH UPPER ROLL AND LOWER DRIVE BELT IN AN UPSTREAM DIRECTION FOR A PREDETERMINED AMOUNT OF MOTOR ANGULAR DISPLACEMENT SUFFICIENT TO MOVE SHEET INTO ALIGNED ABUTTING ENGAGEMENT WITH ABUTMENT SURFACE, THEN REVERSE DRIVE MOTOR TO OPERATE MOTOR IN THE SECOND DIRECTION TO PRODUCE GEAR CHANGE TO DRIVE FOURTH UPPER ROLL AND LOWER BELT IN A DOWNSTREAM DIRECTION

↓

D. SENSING SHEET TRAILING EDGE WITH SECOND PATH FLAG AND TERMINATING MOTOR OPERATION AFTER A PREDETERMINED AMOUNT OF MOTOR ANGULAR DISPLACEMENT SUFFICIENT TO MOVE SHEET INTO REGISTRATION POSITION ON SCANNER PLATE

FIG. 11

SHEET FEEDING APPARATUS FOR FLAT BED OPTICAL SCANNER

BACKGROUND OF THE INVENTION

The present invention relates generally to sheet feeding apparatus and, more particularly, to sheet feeding apparatus for flat bed optical scanners.

Optical scanners are used to generate a data signal representative of an image of an object which is scanned. The data signal generated by an optical scanner is typically transmitted to a computer for storage in a suitable data storage medium such as a floppy disk or is used by the computer to produce a display image of the object.

Various types of optical scanners are currently commercially available, including drum scanners, hand-held scanners, and flat bed scanners. A flat bed scanner has a stationary, transparent plate upon which a document to be imaged is positioned face-down. An optical scanning head located below the plate moves from one end of the plate to the other in a "scanning pass". During a scanning pass, the document placed on the scanner support surface is illuminated by the scanning head which successively focuses images of "scan line" portions of the document on optical sensors. The optical sensors produce a data signal representative of those scan line images.

The type of object which is scanned with a flat bed scanner is typically a flat document such as a page of text or a photograph. When objects to be scanned are provided in sheet form of a uniform size, it is possible to use a sheet feeder in association with the scanner device to sequentially feed the sheets into registration with the transparent plate portion of the scanner.

Currently, most flat bed scanners are sold with sheet feeders available as optional attachments.

SUMMARY OF THE INVENTION

The present invention may comprise a sheet feeding apparatus for sequentially moving sheets into a predetermined registration position with a sheet support surface of an associated optical imaging device. The sheet feeding apparatus comprises a sheet displacement assembly which engages a sheet and moves it along a predetermined displacement path from an upstream position such as a stacking tray to a downstream position in registration with the imaging device support surface. The sheet feeding apparatus includes an abutment surface which is disposed along the displacement path in spaced relationship from the sheet support surface. A drive assembly which may include a reversible electric motor coacts with the sheet displacement assembly to move the sheet downstream a first predetermined distance along the path past the abutment surface. The drive assembly and sheet displacement assembly next coact to move the sheet upstream a second predetermined distance along the path such that an edge portion of the sheet engages the abutment surface and is urged into alignment with it. The abutment surface is disposed perpendicular to the sheet displacement path. Thus, urging the edge of the sheet into alignment with the abutment surface also aligns the sheet with the displacement path. This action corrects any skewing of the sheet relative to the path which may have occurred during initial loading or initial movement of the sheet along the displacement path.

After the sheet has been aligned with the abutment surface and thus the displacement path, it is again moved downstream a predetermined distance to the predetermined registration position with the sheet support surface of the imaging device.

The sheet feeding apparatus may include at least one sensor unit positioned along the path which senses the passage of the trailing edge of the sheet during the sheet's movement along the path. This sensor unit produces a reference signal which is indicative of the position of the sheet along the displacement path. A sheet movement distance monitoring device such an encoder mounted on the drive motor may be used to monitor the distance of sheet movement subsequent to its detection by the sensor unit. Signals from the sensor unit and the distance monitoring device are processed by a data processing unit which generates a control signal responsive thereto for actuating the drive unit to achieve the sheet movements described above. The sheet displacement assembly may include an endless web or conveyor belt which makes frictional contact with a top surface of the sheet to produce upstream sheet movement and subsequent downstream sheet movement. The coefficient of friction between the endless web and the surface of the sheet is sufficiently high to produce straight line sheet movement when the displacement path of the sheet is unobstructed. However, the coefficient of friction is sufficiently low such that when an edge portion of the sheet contacts the abutment surface during upstream movement of the sheet, the sheet is caused to rotate about an axis perpendicular to the plane of the sheet. During the period of upstream movement of the sheet, the bottom surface of the sheet is positioned in relatively low-friction contact with the support surface of the imaging device. This low-friction contact between the sheet and the surface of the imaging device facilitates rotational movement of the sheet during its obstructed upstream movement.

In order to facilitate the above-described movement of the sheet, an overhanging lip is provided above the abutment surface, and a lower ramp surface is provided which extends downstream and downwardly from the abutment surface. In a preferred embodiment of the invention in which the sheet feeding apparatus is a separate unit adapted to be attached to an associated optical imaging device, the overhanging lip, abutment surface, and ramp surface are all integral with the sheet feeding apparatus.

BRIEF DESCRIPTION OF THE DRAWING

FIG. 11 is a block diagram illustrating a sequence of operation of a sheet feeding apparatus.

DETAILED DESCRIPTION OF THE INVENTION

In General

Figure 3:
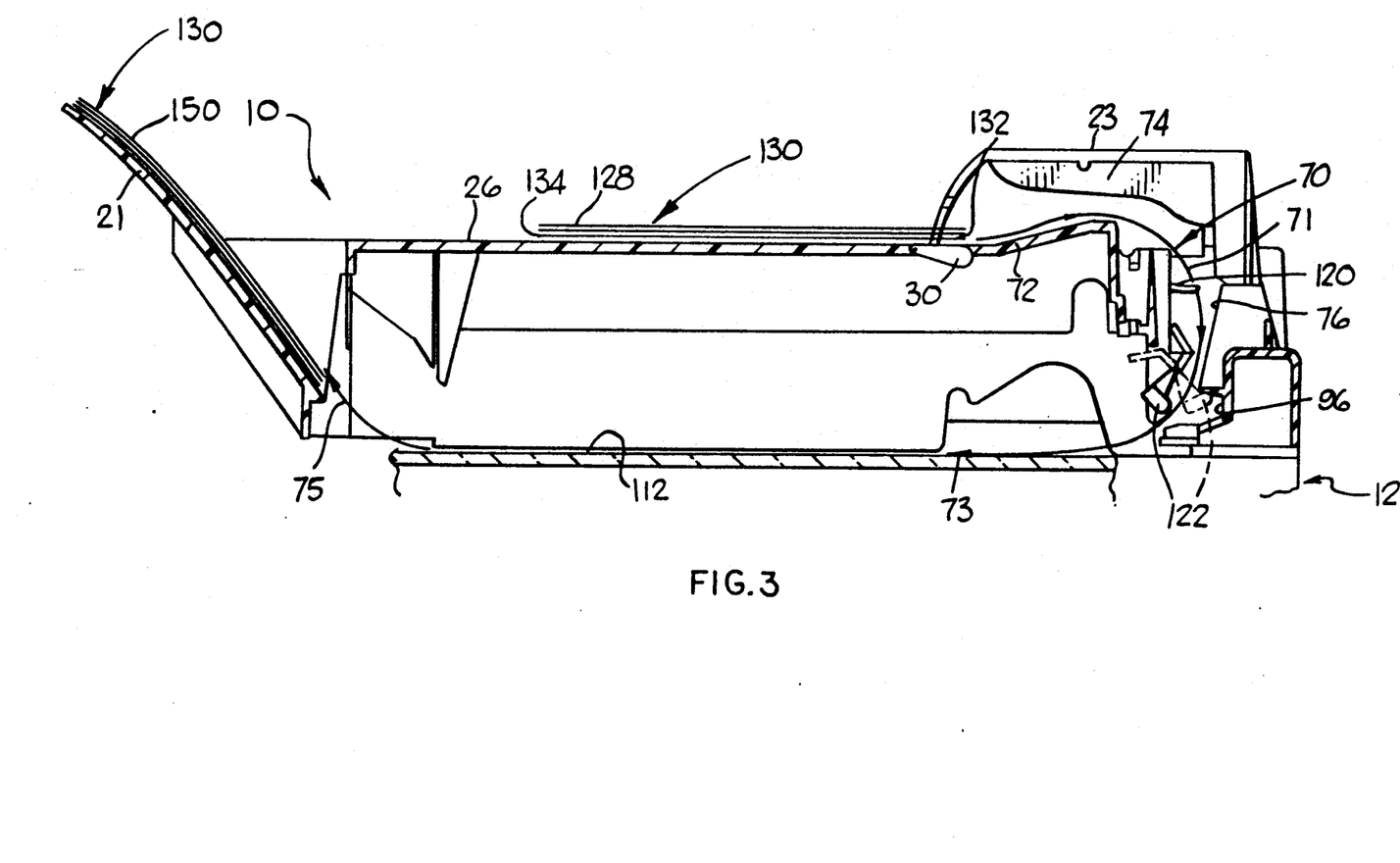
FIG. 3 is a cross sectional side elevation view of the sheet feeding apparatus of FIGS. 1 and 2, with certain portions removed, showing the displacement path of a sheet through the sheet feeding apparatus.
Figure 9:
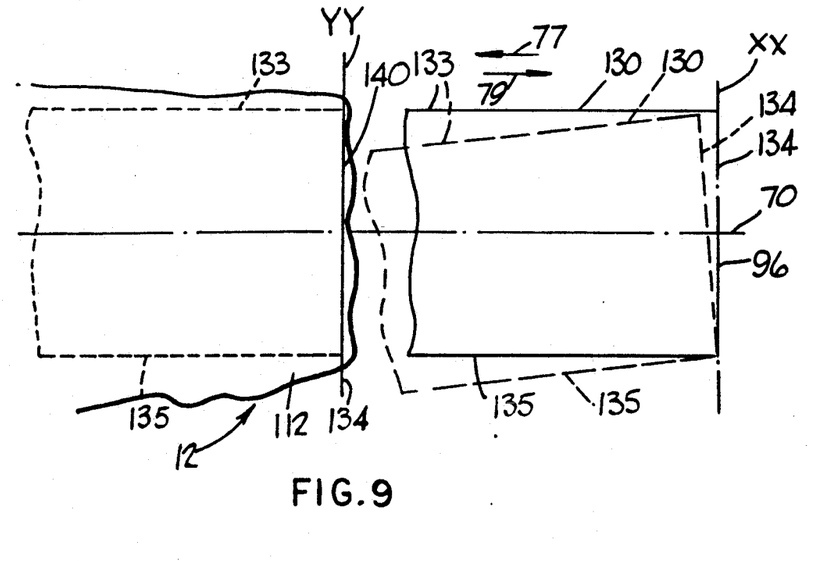
FIG. 9 is a schematic plan view illustration showing successive positions of a document moving along the sheet displacement path including a relatively skewed position relative to the path (long dashed lines), an aligned position with an abutment surface (solid lines), and a registered position (short dashed lines) with an optical scanner document support plate.

The present invention is directed to a sheet feeding apparatus 10, FIG. 3, for sequentially moving sheets 130 into a predetermined registration position 140, FIG. 9, with a sheet support surface 112 of an associated optical imaging device such as a flat bed scanner 12.

Figure 1:
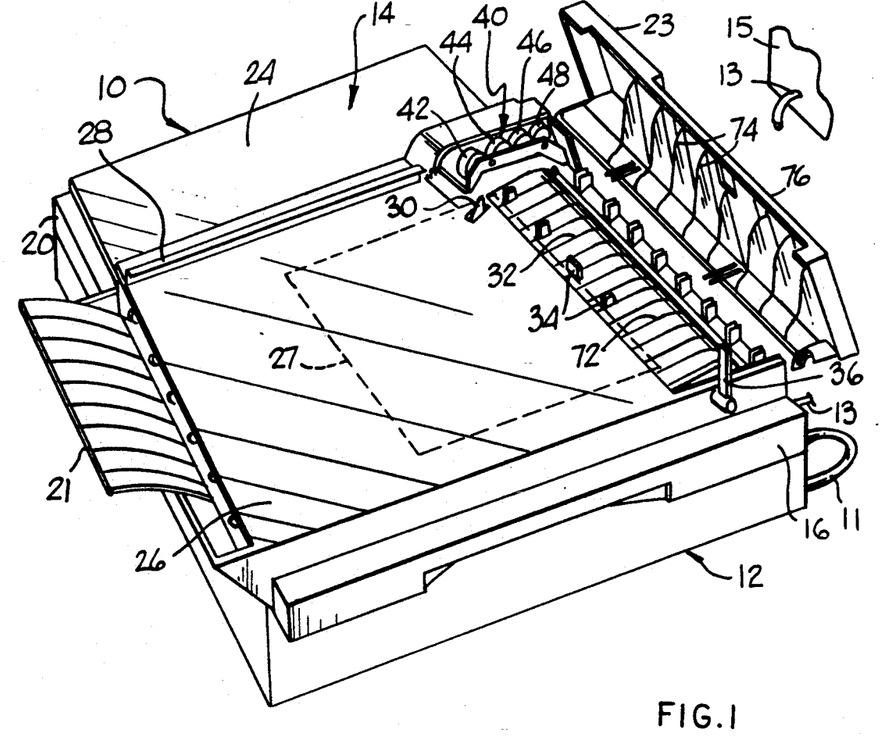
FIG. 1 is a perspective view of a sheet feeding apparatus mounted on a flat bed optical scanner.
Figure 2:
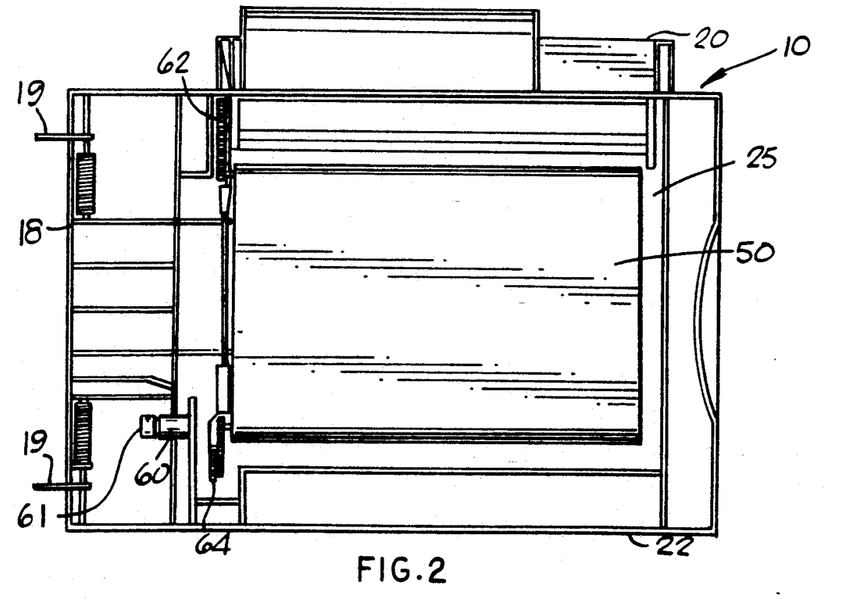
FIG. 2 is a bottom plan view of the sheet feeding apparatus of FIG. 1.

The sheet feeding apparatus in general includes sheet displacement means such as displacement assemblies 40, 50, FIGS. 1 and 2, for displacing a sheet along a predetermined displacement path 70, FIG. 3, having an upstream end and a downstream end.

Figure 4:
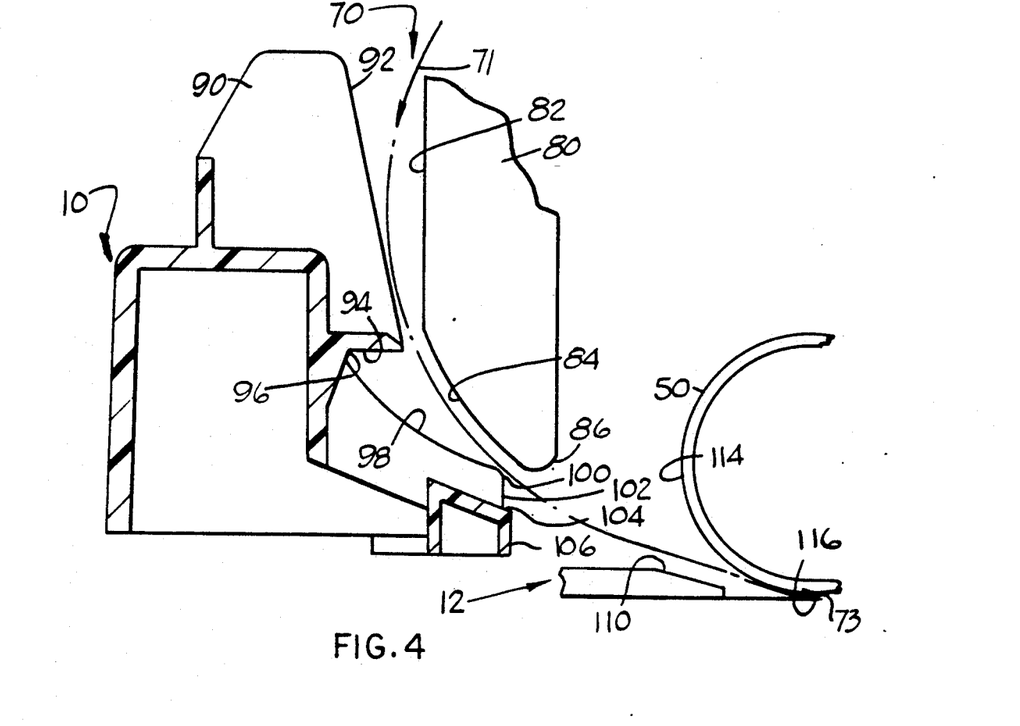
FIG. 4 is a detail side elevation view taken from the side opposite the elevation view of FIG. 3 showing the path of initial downstream movement of a sheet through the sheet feeding apparatus.

The sheet feeding apparatus includes an abutment surface 96 oriented along an axis XX extending perpendicular to the paper path 70, FIGS. 3, 4 and 9, for abuttingly engaging a trailing edge portion 134 of the sheet 130 for aligning the sheet with the displacement path 70.

The sheet feeding apparatus also includes a drive means such as drive motor 60, FIG. 2, which drivingly coacts with the sheet displacement means 40, 50. The drive means operates to move the sheet 130 downstream a first predetermined distance along the displacement path 70 past the abutment surface 96. The drive means is then operated to move the sheet upstream a second predetermined distance along the path 70 into edge-aligning, abutting engagement with the abutment surface 96. The drive means is next operated to move the sheet 130 downstream a predetermined, relatively short distance along the path to the predetermined registration position 140 in alignment with axis YY on the sheet support surface 112 of the imaging device 12. Thus, if a sheet is skewed relative to the displacement path 70 as it is initially moved along the path, the abutting engagement with abutment surface 96 as the sheet is moved upstream along the path will cause the sheet to relatively rotate with respect to the path such that the forward and trailing edge portions of the sheet are aligned perpendicular to the displacement path 70 and parallel to axis YY of the imaging device.

Having thus described the sheet feeding apparatus in general, various features thereof will now be described in further detail.

Apparatus In Detail

FIG. 1 shows a sheet feeding apparatus 10 mounted in a predetermined registration position with a flat bed scanner 12. The sheet feeding apparatus is connected by electrical cable 11 to the scanner 12 which is in turn connected by a cable 13 to a personal computer 15.

As shown by FIGS. 1 and 2, the sheet feeding apparatus has a generally parallelepiped-shaped housing 14 having a front portion 16, a back portion 18, a left lateral side portion 20, a right lateral side portion 22, a top portion 24, and a generally open bottom portion 25. Spring-loaded connecting members 19, FIG. 2, are mounted at the bottom of the housing at a back portion thereof and are adapted to be received in corresponding slots (not shown) provided in a wall portion of the flat bed scanner 12. The connecting members register the sheet feeding apparatus to the scanner. An inclined discharge stacking tray 21 is mounted on and extends upwardly and outwardly from the left lateral side portion of the housing. A sheet path lid member 23 is pivotally mounted on the right lateral side portion 22 of the housing and is adapted to cover a portion of the sheet feed path 70.

A sheet stacking area 26 is provided on a flat surface area on the top portion 24 of the housing. The sheet infeed stacking area is designed to accommodate various sheet sizes. Reference numeral 27 indicates the area which would be occupied by a stack of 8.5"×11" sheets. A stacking guide rail 28 provides an abutment surface against which a lateral edge portion of each of the sheets in a stack may be urged in order to initially align the sheets with sheet displacement path 70. A spring-biased infeed stack sheet sensor flag 30 is provided to sense the presence of one or more sheets 130 in the sheet infeed stacking area 26 and generates a sensor signal in response thereto. The sensor flag illustrated in FIG. 1 is in an "up" position with no sheets present in the stacking area. The sheet sensor flag 30 moves into a "down" position as illustrated in FIG. 3 when sheets are located in the sheet infeed stacking area 26.

A feed path entrance region 32, FIG. 1, on the top portion of the housing has retractable post members 34 provided therealong in perpendicular relationship with path 70. The retractable post members provide an abutment surface against which the leading edge portion of the sheets 130 are urged to properly align the sheets relative to the displacement path 70. The post members 34 may be mechanically retracted by operation of handle 36 which also generates a data signal used in association with the signal from infeed sheet sensor flag 30 and a signal from computer 15 to initiate operation of a drive motor 60.

Sheets 130 are engaged and moved along displacement path 70 by a sheet displacement means which may include a pinch roll assembly 40, FIG. 1, which may be of a conventional type well-known in the art adapted for engaging sheets in the infeed sheet stack one-at-a-time from the top of the stack. One such conventional pinch roll assembly comprises four upper driven rolls 42, 44, 46, 48 and four lower idler rolls (not shown) respectively associated with the driven rolls. The idler rolls each have a small reverse torque applied thereto by a clutch assembly which causes them to rotate in a direction to produce upstream torque when multiple sheets are present. This application of reverse torque facilitates one-at-a-time sheet feeding and is well-known in the art. The pinch roll assembly 40 moves an engaged sheet through a first predetermined portion of the feed path.

The sheet displacement means also comprises an endless conveyor belt 50, FIG. 2, disposed inside of the housing and supported on rollers (not shown) journalled to front and back wall portions of the housing. The endless conveyor belt 50 may also be of a conventional type well-known in the art adapted to engage and move a sheet through frictional surface contact with the sheet's upper surface as its lower surface slides over the surface of an underlying scanner support plate 112.

The pinch roll assembly and the endless conveyor belt assembly are driven by a drive means which may comprise a single conventional reversible electric drive motor 60 provided with an electronic encoder unit 61, FIG. 2, and which is geared through a conventional gear assembly 62, 64 to both the pinch roll assembly 40 and the endless conveyor belt 50. The pinch roll assembly 40 and the endless conveyor belt 50 are driven by the drive motor 60 at predetermined periods during a sheet displacement cycle. The relative direction of movement of pinch roll assembly 40 and conveyor belt 50 are determined by the configuration of the gear assembly 62, 64. The configuration of gear assembly 62, 64 is changed by changes in the direction of rotation of drive motor 60. Gear assemblies of this type which have a predetermined number of gear configurations which are sequentially selected through reversing the direction of rotation of the associated drive motor are conventional and well-known in the art. Alternatively, drive motor 60 and gear assembly 62, 64 could be replaced by two or more separate drive motors (not shown) associated with pinch roll assembly 40 and belt 50, respectively.

Figure 7:
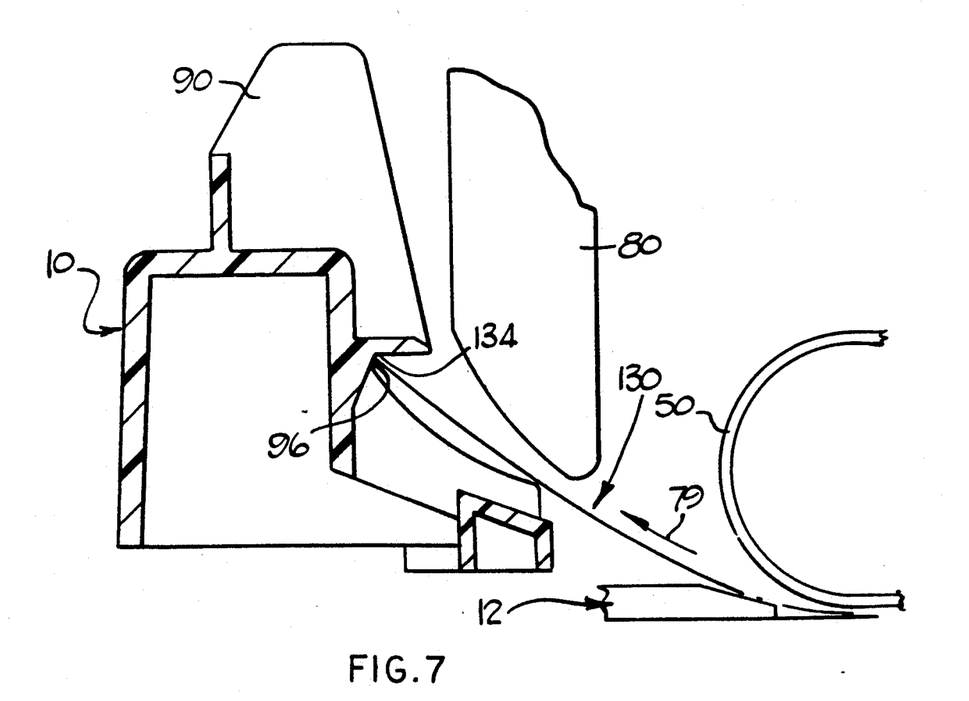
FIG. 7 is the same elevation view of the apparatus as FIGS. 4–6 and shows a document on which the trailing edge portion has been moved upstream into aligning engagement with an abutment surface.
Figure 8:
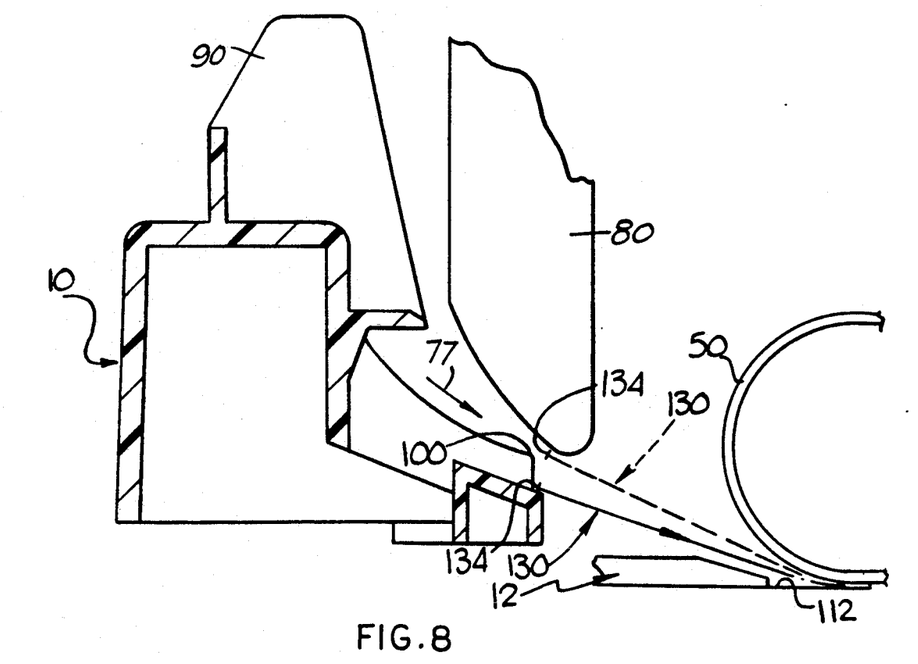
FIG. 8 is the same elevation view of the apparatus shown in FIGS. 4–7 and shows a document on which the trailing end portion has initially moved off a ramp surface of the apparatus and then begins to move downwardly as the document moves downstream through the apparatus.

As illustrated in FIGS. 3 and 4, sheet displacement path 70 extends between the infeed stack area 26 and the discharge stacking tray 21. Depending upon the point in the operating cycle, sheet displacement may be in a downstream direction 77, FIG. 5, or an upstream direction 79, FIG. 7. The sheet displacement path comprises a first generally arcuate portion 71 which extends from the sheet infeed area to the endless conveyor belt 50, a linear portion 73 extending below the endless conveyor belt and along the top surface 112 of the scanner 12, and a second arcuate portion 75 extending from the scanner surface 112 to the discharge stacking tray 21.

The sheet displacement path is defined by a rib portions 72 on the housing top surface and rib portions 74 on the lid member 23. The paper path is further defined by interior surface portions 76 of the housing and by opposed surface portions of the scanner 12 and endless conveyor belt 50. For clarity, the conveyor belt 50 is not shown in FIG. 3 but may be seen in FIGS. 4–8.

As shown in FIGS. 4–8, the interior portions of the feed apparatus which define the feed path include an inwardly positioned, outwardly projecting rib member 80 and an outwardly positioned, inwardly projecting rib member 90. A pair of such inwardly positioned and outwardly positioned rib members 80, 90 are provided in association with each of the rib members 74 on the lid 23 and are generally vertically aligned therewith. As best shown in FIG. 4, each inwardly positioned rib member comprises a generally vertically extending surface portion 82, a downwardly and inwardly inclined surface portion 84, and a rounded end surface portion 86. Each outwardly positioned rib member 90 comprises a downwardly and inwardly inclined surface portion 92; an overhanging and generally horizontally disposed lip surface portion 94; a downwardly and outwardly inclined abutment surface portion 96; an arcuate, downwardly and inwardly inclined ramp surface 98; a rounded shoulder surface portion 100; a generally vertically extending surface portion 102; a second shoulder surface portion 104; and a second generally vertically extending surface portion 106.

A portion of the scan path is defined by a beveled scanner housing surface 110 followed by a planar scanner transparent plate surface 112 which is adapted to support a document thereon during a scanning operation. A document conveyed along the scan path passes under an arcuate portion 114 of the conveyor belt and is engaged by a planar portion 116 of the conveyor belt at approximately the same position at which the document comes into contact with the planar surface 112 of the scanner. The portion of the scan path upstream 79 from the conveyor belt 50 is generally arcuate in shape. The radius of curvature of the arcuate portion 71 of the scan path immediately opposite lip surface 94 may be approximately 43 mm.

Figure 5:
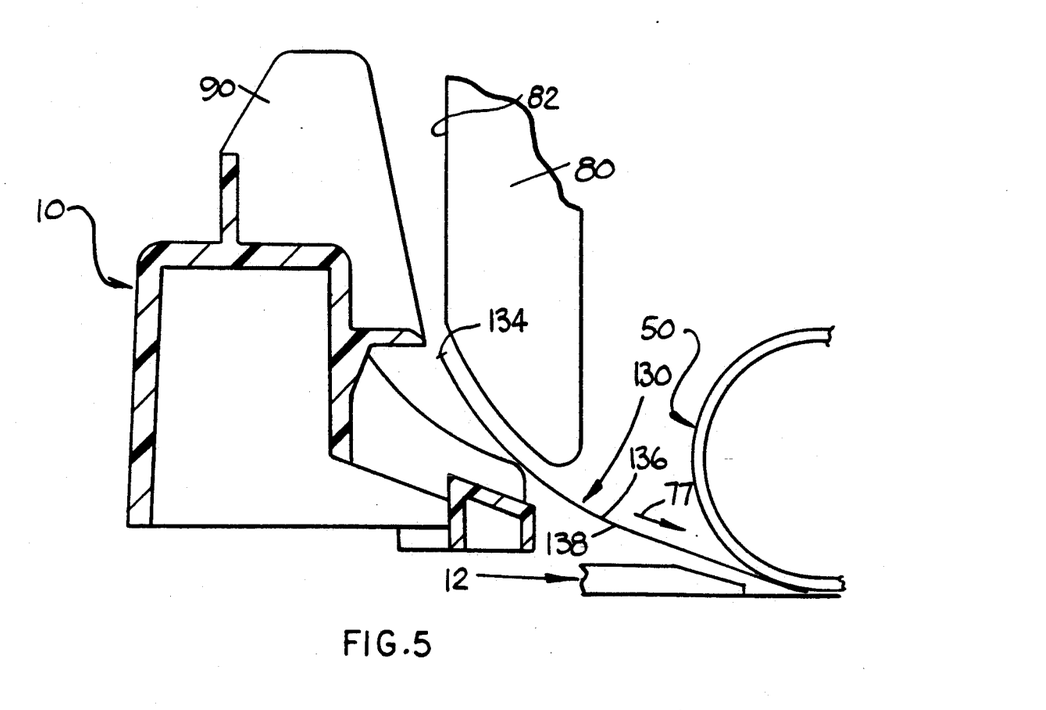
FIG. 5 is the same detail elevation view as FIG. 4 but showing a sheet which has moved downstream along the displacement path to a position at which the trailing edge of the document has travelled past an overhanging lip surface and at which downstream movement of the document along the path has terminated.
Figure 6:
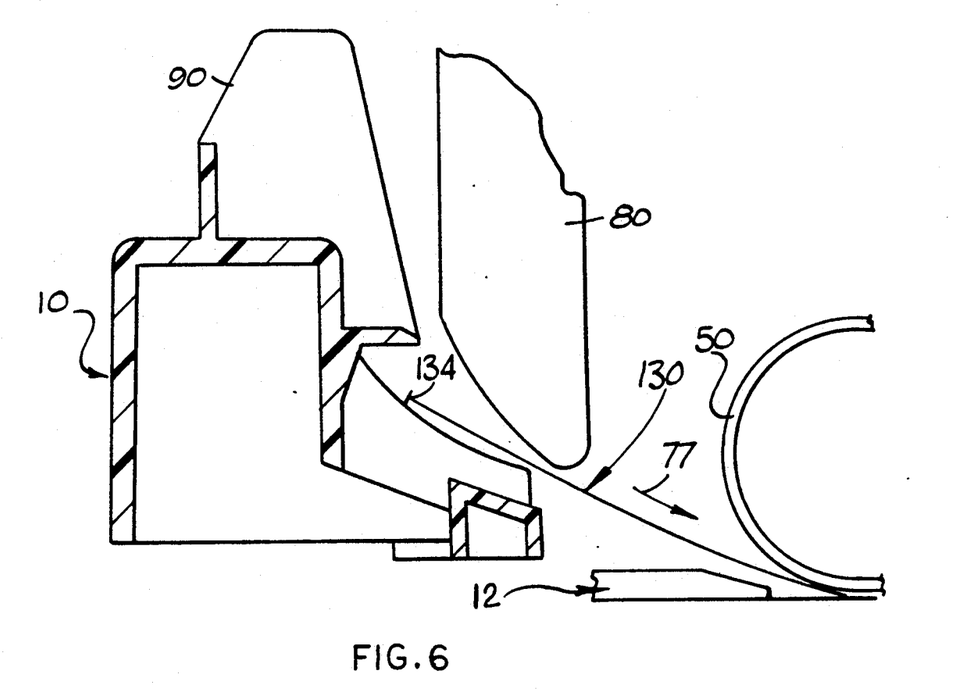
FIG. 6 is the same elevation view of the apparatus as FIGS. 4 and 5 and shows a document after the trailing edge thereof has been moved from the position of FIG. 5 down onto a ramp surface of the apparatus.

As best illustrated in FIGS. 3, 5 and 9, each sheet 130 in the infeed sheet stack 128 is rectangular in shape and comprises a leading edge portion 132; a trailing edge portion 134; a first lateral side edge portion 133; a second lateral side edge portion 135 portion; a first surface portion 136; and an opposite, second surface portion 138.

Referring again to FIG. 3, it may be seen that a first displacement path sensor flag 120 is positioned along the arcuate portion 71 of the scan path at a position where a sheet disengages from the fourth driven pinch roll 48 of the first displacement assembly 40. The sensor flag 120 may comprise a conventional flag assembly including a pivotal member which is initially pivotally moved in one direction by passage of a leading edge portion 132 of a sheet thereover and is biased to move in the opposite direction after the passage of a trailing edge portion 134 of a sheet. Leading edge and trailing edge detection signals are generated by associated first displacement flag electronics in response to the passage of each sheet.

Again referring to FIG. 3, it will be seen that a second displacement path flag 122 is provided at a location along the arcuate portions 71 of the feed path 70 immediately downstream from surface 94. Flag 122 may be tripped in the same manner as flag 120 to generate leading edge and trailing edge detection signals.

The displacement of a sheet along the sheet displacement path 70 and the correction of skew in the sheet with respect to the displacement path and the subsequent registration the sheet with a registration position 140 on the surface 112 of the optical scanner 12 will now be described.

Figure 10:
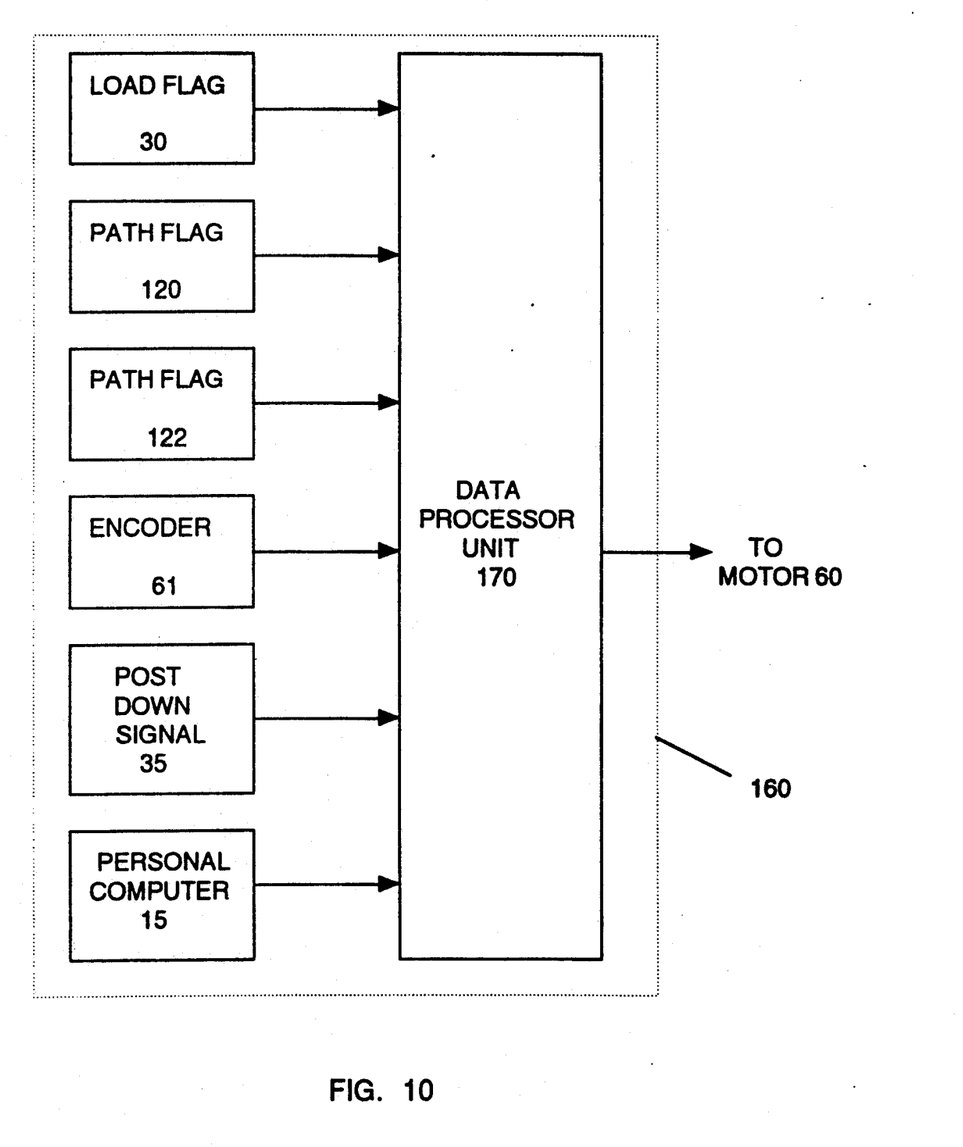
FIG. 10 is a block diagram showing different signals processed and generated by a sheet feeder data processing unit.

FIG. 10 illustrates the basic functional components of the control unit 160 of the feed apparatus. The control unit may comprise motor encoder 61, flag 30, flag 120, flag 122, a post 34 position sensor 35, and scanner software in computer 15. The motor encoder, flags, post sensor, and computer software all provide signals to a data processing unit 170 which processes these data signals and generates control signals to actuate the drive motor 60 to drive the pinch roll assembly 40 and the conveyor belt assembly 50. The method by which the data processor unit processes these signals is illustrated generally in the flow chart of FIG. 11 and is described in further detail below. It will be appreciated by those having skill in the art that the described functions of the control assembly 160 may be performed by use of computer software or firmware, or may be performed through use of hardwired electronic components, or may be performed by some combination of the above. In one preferred embodiment of the invention, the data processor unit 170 comprises a microprocessor with on-board ROM and firmware to control the paper motion functions (e.g. microprocessor Model No. 83C51FA manufactured by Intel Corporation).

The sheet feeder is located on top of the scanner such that the scan path 70 is located perpendicular to or, alternatively, parallel to the displacement path of the scanner head within the scanner. The sheet feeder apparatus 10 places a sheet at a predetermined position on the scanner support surface 112 in rectilinear alignment with the scan path of the scanner 12.

Operation

The basic operation of the apparatus is summarized in FIG. 11 and is described in detail below. Initially, a paper stack 128 is placed on the top surface 26 of the scanner housing 14 and first lateral edge portions 133 of each sheet 130 are urged by the human operator against stacking guide rail 28. The leading edge of each sheet in the stack is also urged by the operator against retractable post members 34 to initially align the sheets with the displacement path 70. The infeed load flag 30 is depressed by the sheet stack and a paper load signal is sent to data processing unit 170. When the operator is ready to begin feeding, he moves handle 36 to retract the post members. The movement of handle 36 to retract post members 34 causes a signal to be sent by post sensor 35 to processing unit 170. The computer 15 connected to the feed apparatus 10 also generates a load signal (a "Change Document" command) in response to the operator's input by means of appropriate scanner/feeder driving software such as, for example, Omnipage sold by Caere Corporation, 100 Cooper Court, Los Gatos, Calif. 95030. The feed apparatus processor 170, in response to these signals from flag 30, post sensor 35, and computer 15, generates a control signal to actuate the drive motor 60 in a first rotation direction. Operation of the drive motor in the first direction initiates a first gear configuration in which all four rolls of the pinch roll assembly 40 are driven to rotate in a downstream (feed) direction to begin the sequential feeding of sheets 130 along feed path 70. Assembly 50 is also engaged to operate in a downstream direction at the same surface speed as the surface speed of assembly 40. (When reference is made herein to operation of drive units 40 or 50 in an "upstream" or "downstream" direction, it is to be understood that this means that the drive units are operated in a manner so as to produce "upstream" or "downstream" displacement of an engaged sheet.)

As the first sheet leading edge engages flag 120, it causes flag 120 to be pivotally displaced and to generate a signal indicative of the passage of the leading edge of the sheet. The leading edge portion 132 of the sheet next engages and trips flag 122 which transmits a signal in response thereto.

The trailing edge portion 134 of the sheet next passes over flag 120 which emits a signal indicative of the passage of the trailing edge of the sheet. The trailing edge next passes over flag 122 which generates a signal indicative of the passage of the trailing edge 134.

The data processing unit in response to sensing leading edge 132 at sensor 120 issues a command to reverse the operation of the drive motor 60 to drive it in a second rotation direction which causes a change in the configuration of drive gear assembly 62, 65 which produces continued driven rotation of the fourth pinch roll 48 in the same (downstream) direction but which also produces disengagement and "free wheeling" operation of the first three pinch rolls 42, 44, 46 to effect the one-at-a-time sheet feed operation described above. After this gear change, the lower belt assembly 50 remains operating in the same (downstream) direction as before the motor reversal.

In response to sensing the passage of the leading edge portion 132 of the sheet by sensor 120, the data processing unit also begins counting encoder pulses from drive motor encoder 61 and compares the count to a predetermined number stored in memory which is representative of the sheet path distance between flag 120 and flag 122. If the second flag 122 is not tripped by the leading edge portion of the sheet within a predetermined tolerance of this predetermined path distance, then the computer generates a command to stop the drive motor and to display a paper jam error message on the computer screen.

If no paper jam is sensed, the sheet continues its downstream movement until the trailing edge portion 134 of the sheet is sensed at the first path sensor flag 120. After the sensing of the passage of the trailing edge 134 at the first displacement path flag 120, the sheet continues for a predetermined distance (as determined by processor 170 by counting encoder pulses after the sensor signal) in the downstream direction 77 along displacement path 70. At the end of this predetermined distance, the motor is reversed to again rotate in the first direction with a resulting gear change causing the sheet to come to a stop briefly and then begin moving upstream 79. The predetermined distance of web travel of the trailing edge past the flag 120 location may be, e.g., 45.53 mm which may occur after 829 encoder pulses.

As illustrated in FIG. 5, at the point where the sheet comes to a stop, the trailing edge 134 has moved past overhanging lip portion 94 and is unsupported by any housing surface. Thus, as a result of gravitational force and paper bending moment, trailing edge 134 moves downwardly to the position illustrated in FIG. 6. In this new gear configuration which occurs after the trailing edge has moved a preset distance past flag 120, the first three pinch rollers in displacement unit 40 remain in a free wheeling state and the fourth roll 48 begins rotating in an upstream direction. Belt 50 briefly comes to a stop and is then driven in an upstream 79 direction. The sheet is thus moved upstream, trailing edge first, along the path 70. The sheet is moved upstream along the path for a predetermined distance of movement of the surface of belt 50, e.g. 31.23 mm inches, which is determined by counting of encoder pulses, e.g. 569.

The distance of upstream movement of conveyor belt 50 is selected such that return movement of sheet 130 along path 70 is sufficiently long for the trailing edge 134 to come into contact with abutment surface 96 and to be slippingly aligned with abutment surface 96. As used herein, the phrase "slippingly aligned" refers to the fact that the surface 136 of the sheet which is engaged by the surface of conveyor belt 50 will slip relative to the conveyor belt once the trailing edge portion 134 of the sheet has come into contact with abutment surface 96. The position of abutment surface 96 is indicated by axis XX in FIG. 9. If the sheet 130 is misaligned, i.e. skewed with respect to the feed path 70, then only a corner portion of the sheet will initially engage surfaces 96 and stop moving as shown by long dashed lines in FIG. 9. The remainder of the sheet will be rotated about this initial point of engagement between the sheet and surfaces 96 by differentially slipping, frictional contact with the surface of drive belt 50 until the sheet 130 is rotated to a position in alignment with axis XX as indicated in solid lines in FIG. 9.

As previously mentioned, the above-described upstream displacing movement of conveyor belt 50 is monitored by counting encoder pulses occurring after upstream movement began. After a predetermined number of encoder pulses, a command is given to reverse the direction of motor rotation, causing it to again rotate in the second direction which causes a reconfiguration of the gear assembly so that conveyor 50 is again reversed and begins displacing the aligned sheet 130 in a downstream direction 77. The first three pinch rolls remain disengaged and the fourth pinch roll begins rotation in a downstream direction as a result of this motor reversal and gear change. As the trailing edge 134 of the sheet moves over shoulder surface 100 it is no longer supported and, due to the force of gravity, etc., begins moving downwardly as indicated by the juxtaposition of the phantom line with the solid line representation of sheet 130 in FIG. 8. The sheet thereafter continues moving downstream 77 a predetermined distance, as determined by counting encoder pulses, after the trailing edge is sensed by second path flag 122 immediately downstream from surface 96. The distance of downstream movement is selected such that the trailing edge 134 is placed in position 140 in alignment with a registration axis YY on the surface 112 of scanner 12 when downstream movement is terminated, FIG. 9. The sheet is maintained in this registration position shown at 140 in FIG. 9 during a scanner operation, the completion of which is indicated to the processor 170 of the feed apparatus by a "Change Document" command produced by the scanner driver software in computer 15. (Although two sensor units are employed in the preferred embodiment described above, it would be possible to use a single sensor unit for establishing an edge position reference signal from which the various control commands may be derived.)

In response to the "Change Document" command and a signal from infeed load flag 30 indicating that sheets remain in the infeed stack on surface 26 and in response to a continued post down signal from post sensor 35, the motor 60 is again reversed to operate in the first rotation direction causing an associated gear change to cause the four driven rolls in displacement unit 40 to become engaged and rotate in a downstream direction and causing conveyor belt 50 to be driven in a downstream direction. Displacement assembly 40 thus begins moving a second sheet along displacement path 70 and displacement assembly 50 displaces the first sheet from its registration position on the scanner surface into the discharge tray 21. Thus, with the drive motor reversal and operation of the drive motor in the first direction, the beginning of a new sheet displacement cycle is commenced at the same time that the previous displacement cycle is being completed. This sheet displacement cycle is repeated so long as sheets remain in the feed area 26 of the scanner. When the last sheet leaves the feed area, flag 30 generates a signal so indicating to processor 170 which modifies the last stage of the next sheet displacement cycle. In the modified sheet displacement cycle, everything is identical to the previous cycle except that, in response to the next "Change Document" command, the processor 170 issues a command to continue operation of motor 60 in the same (second) direction as its previous operating state for a predetermined number of encoder pulses. This continued operation of the motor in the same direction causes no gear change, and thus the drive belt continues its operation in a downstream direction for a sufficient distance to discharge the last sheet 130 into tray 21. Operation of the motor 60 is then terminated.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A sheet feeding apparatus for sequentially moving sheets into a predetermined registration position with a sheet support surface of an associated optical imaging device comprising:

sheet displacement means for engagingly, guidingly displacing said sheet along a predetermined displacement path having an upstream end and a downstream end;

abutment means disposed along said displacement path in spaced relationship from said sheet support surface for abuttingly engaging a trailing edge portion of said sheet for aligning said sheet with said displacement path; and drive means for drivingly coacting with said sheet displacement means for moving said sheet downstream a predetermined distance along said path past said abutment means, then moving said sheet upstream a predetermined distance along said path into edge aligning, abutting engagment with said abutment means and then moving said sheet downstream a predetermined distance along said path;

further comprising control means for controlling said drive means comprising:

sensor means disposed along said displacement path for sensing leading and trailing edge portions of said sheet and generating sensor signals responsive thereto;

distance monitoring means for monitoring the displacement of said sheet along said displacement path and generating a travel signal responsive thereto; and data processing means for processing said sensor signal and said travel signal and for generating control commands for actuating said drive means in response to said signal processing.

2. The invention of claim 1 wherein said abutment surface means comprises a laterally extending, linear surface configuration.

3. The invention of claim 1 wherein said abutment surface comprises a plurality of laterally spaced apart surfaces.

4. The invention of claim 1, said abutment means comprising a planar abutment surface, and further comprising:

a generally horizontally and longitudinally disposed overhanging lip surface attached to one end of said planar abutment surface; and a ramp surface positioned below said overhanging lip surface and adapted to support a trailing edge portion of said sheet during a portion of said initial downstream movement of said sheet and during upstream movement of said sheet.

5. The invention of claim 1 wherein said sheet feeding apparatus is removably attachable to said associated optical imaging device at a predetermined position relative to said sheet support surface.

6. The invention of claim 1, said predetermined displacement path comprising an arcuate path portion, said abutment means being disposed along said arcuate path portion an proximate said sheet support surface.

7. A sheet feeding apparatus for sequentially moving sheets into a predetermined registration position with a sheet support surface of an associated optical imaging device comprising:

sheet displacement means for engagingly, guidingly displacing said sheet along a predetermined displacement path having an upstream end and a downstream end;

abutment means disposed along said displacement path in spaced relationship from said sheet support surface for abuttingly engaging a trailing edge portion of said sheet for aligning said sheet with said displacement path;

drive means for drivingly coacting with said sheet displacement means for moving said sheet downstream a predetermined distance along said path past said abutment means, then moving said sheet upstream a predetermined distance along said path into edge aligning, abutting engagement with said abutment means and then moving said sheet downstream a predetermined distance along said path;

said sheet displacement means comprising:

a first displacement means for engagingly, guidingly displacing said sheet along a first portion of said displacement path; and a second displacement means for frictionally nonslippingly, guidingly displacing said sheet along a second portion of said displacement path in an unobstructed path mode of operation and for frictionally slippingly, rotatingly displacing said sheet relative to said displacement path in an obstructed path mode of operation associated with said edge aligning, abutting engagement of said sheet with said abutment means.

8. The invention of claim 7 wherein said abutment surface comprises a plurality of laterally spaced apart surfaces.

9. The invention of claim 7, said abutment means comprising a planar abutment surface, and further comprising:

a generally horizontally and longitudinally disposed overhanging lip surface attached to one end of said planar abutment surface; and a ramp surface positioned below said overhanging lip surface and adapted to support a trailing edge portion of said sheet during a portion of said initial downstream movement of said sheet and during upstream movement of said sheet.

10. The invention of claim 7 wherein said sheet feeding apparatus is removably attachable to said associated optical imaging device at a predetermined position relative to said sheet support surface.

11. The invention of claim 7, said predetermined displacement path comprising an arcuate path portion, said abutment means being disposed along said arcuate path portion an proximate said sheet support surface.

12. The invention of claim 7 wherein said second displacement means comprises an endless belt positioned adjacent to said sheet surface support.

13. The invention of claim 7 wherein said abutment surface means comprises a laterally extending, linear surface configuration.

14. The invention of claim 13 wherein said laterally extending, linear surface configuration extends normal to said displacement path.

* * * * *